United States Patent [19]
Bevans

[11] 3,925,851
[45] Dec. 16, 1975

[54] PLASTIC HOSE CLAMP

[76] Inventor: Douglas L. Bevans, 134 Dornie Road, Oakville, Ontario, Canada

[22] Filed: May 20, 1974

[21] Appl. No.: 471,359

[52] U.S. Cl. ............................................. 24/20 TT
[51] Int. Cl.² ......................................... B65D 63/02
[58] Field of Search ............ 248/74 PB, 74 B, 74 A; 24/20 TT, 255 SL, 16 PB, 256, 257, 285, 286

[56] References Cited
UNITED STATES PATENTS

| | | | |
|---|---|---|---|
| 1,509,022 | 9/1924 | Noble | 24/285 X |
| 1,804,725 | 5/1931 | Walker | 24/20 TT |
| 3,266,109 | 8/1966 | Thomas | 24/20 TT |
| 3,605,200 | 9/1971 | Vallinotto et al. | 24/20 TT |
| 3,735,449 | 5/1973 | Rosales | 24/16 PB |
| 3,747,164 | 7/1973 | Fortsch | 24/16 PB |

FOREIGN PATENTS OR APPLICATIONS

| | | | |
|---|---|---|---|
| 518,012 | 3/1953 | Belgium | 24/16 PB |
| 16,718 | 9/1892 | United Kingdom | 24/285 |

Primary Examiner—Donald A. Griffin
Attorney, Agent, or Firm—K. Maxwell Hill

[57] ABSTRACT

This invention comprises a plastic hose clamp embodying in combination an open-ended hose-surrounding band and a clamping assembly integral therewith, said assembly comprising first and second interlocking parts, said parts each including a jaw, said jaws being opposed, a tongue spaced from and substantially parallel with each of said jaws to provide with said jaws a pair of cavities into which the opposing jaws may extend, said jaws interlocking by way of a set of triangularly prismoidal teeth on each jaw wherein as viewed in diametrical cross-section the vertex-edges of the teeth of one jaw converge from the outer ends of such vertex-edges toward an exterior apical midpoint and the vertex-edges of the teeth of the other jaw converge to an interior apical midpoint.

1 Claim, 3 Drawing Figures

PLASTIC HOSE CLAMP

GENERAL CHARACTER OF THE INVENTION

The present invention relates to hose clamps, being characterized by manufacture entirely of plastic and consisting of only one part so that no separate component can be mislaid. In principle the locking facility comprises a set of interengaging tongues and jaws which the latter are interlockingly ratcheted. One jaw is insertable within the cavity formed between an opposed jaw and an underlying tongue. Tightening of the band of the clamp around a hose may be effected by the application of pliers to certain serrated surfaces which conveniently converge for that purpose and project from the band to support the said tongues and jaws.

Essential to the foregoing are means whereby the clamp is constructed strongly to resist detachment through being skewed, as well as means for effecting a particularly tight binding action of the band portion upon the hose.

DESCRIPTION OF THE PRIOR ART

One-piece plastic hose clamps are known employing interlocking jaws and tongues. The disadvantage of the same is that however they can at undesirable times and through mischance and the like, become detached from the associated hose by a skewing action wherein the band portion is wrenched from a true ring-form into a helix with the separated ends no longer in interfacing relationship.

ADVANTAGES OF THE PRESENT INVENTION

The inventive idea which the disclosed structure teaches is twofold; namely, first the formation of a set of interlocking teeth such that they strongly resist wrenching of the associated band from ringform into helical form, and secondly the provision of means for tightening the band upon a hose having the characteristics aforesaid by the particular configuration of the inner surface of such band so that extra pressure is exerted upon the hose around a circumscribing line more than over a broad surface.

With the foregoing in view, and such other or further purposes, advantages or novel features as may become apparent from consideration of this disclosure and specification, the present invention consists of the inventive concept comprised, embodied, embraced or included in any means, method, process, product, construction, composition, arrangement or combination of parts, or new use of any of the foregoing, which may herein be exemplified in one or more specific embodiment of such concept, reference being had to the accompanying drawings in which.

In the drawings like characters of reference designate similar parts in the several Figures.

SUMMARY OF THE DESCRIPTION

Figure 1:
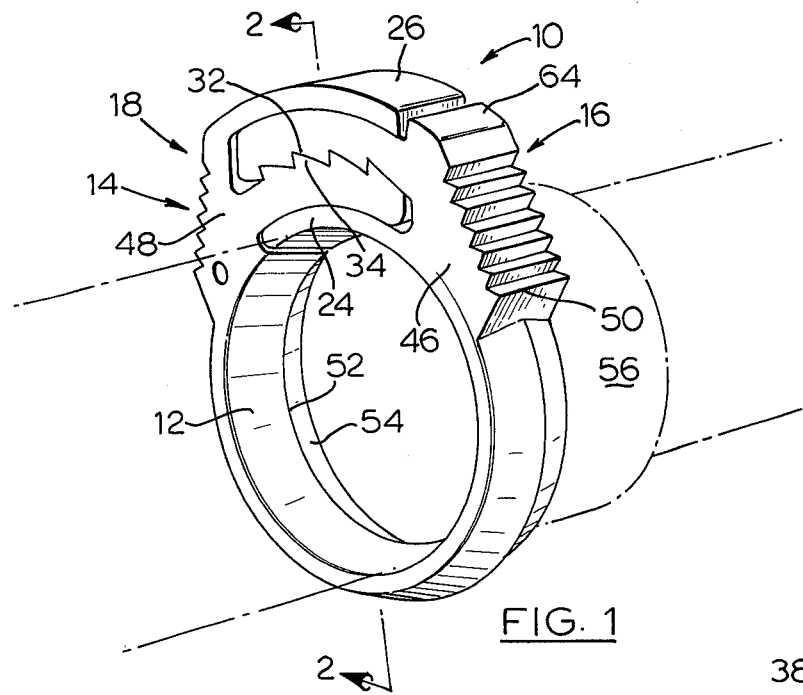
FIG. 1 is a perspective representation of the invention.
Figure 2:
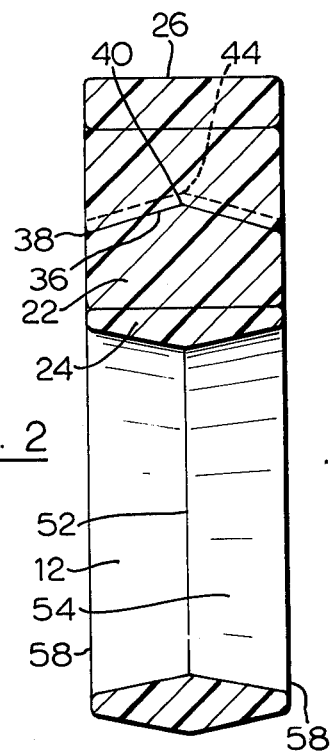
FIG. 2 is a section on the line 2—2 of FIG. 1.

To identify and import consonance of language used in this specification between the disclosure and the claims thereof in describing and defining the parts of the invention and their relationship, the said invention is a plastic hose clamp collectively designated 10 comprising in combination an open-ended hose-surrounding band 12 and a clamping assembly 14 integral therewith, said assembly comprising first and second interlocking parts 16 and 18, said parts each including a jaw 20 and 22, said jaws being opposed, a tongue 24 and 26 spaced from and substantially parallel with one or other of said jaws to provide with the latter a pair of cavities 28 and 30 into which the opposing jaws may extend, said jaws interlocking by way of a set of triangularly prismoidal teeth 32 and 34 on each jaw, wherein, as viewed in diametrical cross-section, the vertex-edges of the teeth of jaw 22 converge from the outer ends 38 of such vertex-edges toward an exterior apical midpoint 40, and the vertex-edges 42 of the jaw 20 converge to an interior apical midpoint 44.

Figure 3:
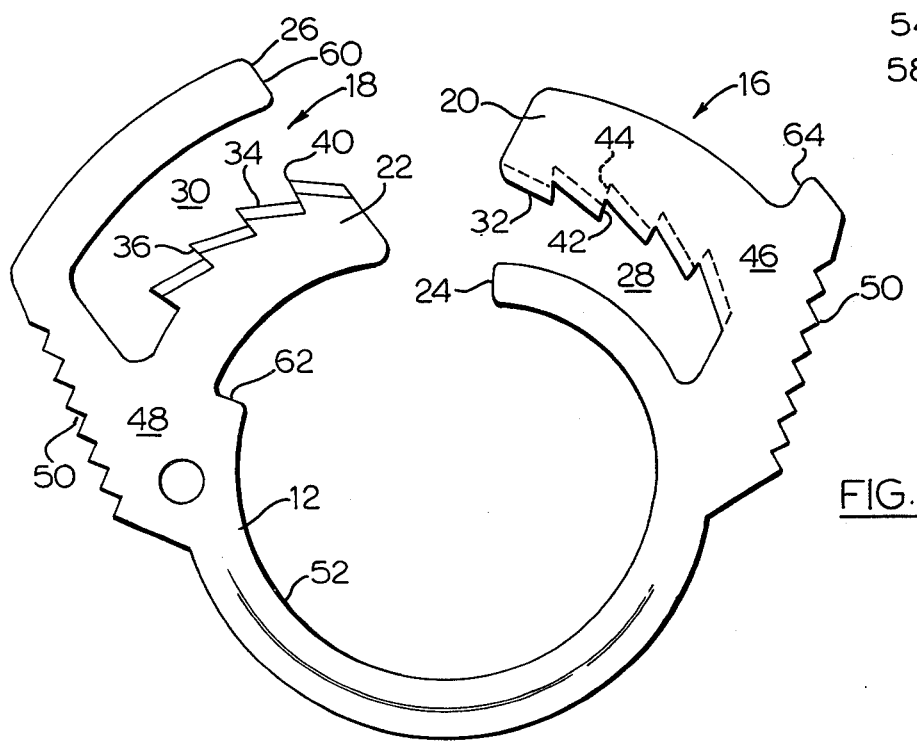
FIG. 3 is a side elevation of the invention shown opened.

The two interlocking parts 16 and 18 are generally on opposite ends of the band 12 and offset in the rotary plane of the band as best shown in FIG. 3 wherein part 18 is slightly generally outboard of part 16. The parts 16 and 18 each include a supporting portion 46 and 48, jaw and tongue 20 and 24 being secured to portion 46 while jaw and tongue 22 and 26 are fixed to portion 48. The supporting portions have serrated surfaces 50 which converge outwardly of the band at least when the clamp is substantially in positions between the tightly locked one of FIG. 1 and a more loosely locked position or the unlocked position of FIG. 3, to facilitate the acceptance of tightening pliers.

When the clamping assembly is interlocked it appears as an outward progression of alternate tongues and jaws of which the inmost and outmost are the oppositely directed tongues 24 and 26 with the tongues and jaws paired and projecting reciprocately into the cavities 28 and 30, the cavities each being formed primarily of a paired adjacent tongue and jaw designed to receive the jaw of the opposite paired tongue and jaw.

The longitudinal centerline 52 of the inner surface 54 of the band 12 is of smaller diameter when tightened on a hose 56 than the outer edges 58 parallel therewith so that said inner surface in substantially diametrical cross-section is seen to be of shallow conical configuration with the vertex (the centre line 52) projecting. Thus a very tight binding effect upon a piece of hose can be effected when the device is tightened up as in FIG. 1.

COMPLETE DESCRIPTION

The distal ends 60 of the tongues 24 and 26 abut the shoulders 62 and 64 respectively when the clamp is tightened to the utmost extent or to prevent excess tightening. It will be appreciated that the invented clamp can be employed with a hose of varying diameter and generally speaking it may be said that if a clamp is used upon hose about which it can be tightened to the extent that the ends of the tongues come up against the aforesaid shoulders without the application of considerable tightening effort being required to effect that condition, the clamp is too large for that hose, therefore it is to be understood that the clamp is manufacturable in a variety of different sizes.

The teeth 32 and 34 are ratchet teeth and when they are interlocked by a tightening effort in the rotary plane of the clamp can not be unlocked by reverse movement in that plane. Furthermore, in general, only by a deliberate skewing effort, or else by destruction of the clamp can the same be separated from the hose which it encircles, after being tightened upon it. The deliberate unlocking method is that of applying a powerful skewing action or transverse sheer (parallel with the hose) between the two sets of teeth 32 and 34. This must clearly alter the configuration of the band 12 from that of a plain ring to a single turn helical coil form. Impact against the side of one of the supporting portions 46 or 48 could not be clamped out of locked position if the teeth 32 and 34 were not "hilled" across their width in the way described. Such hilling, however, makes it practically impossible to strike the clamp out of locking position.

Various modifications may be made to the invention described and be within the scope of the concept disclosed. It is intended, therefore, that the foregoing disclosure shall be considered as illustrative of such concept and not as limiting the protection sought to any particular embodiment thereof.

What is claimed is:

1. A plastic hose clamp comprising in combination an open-ended hose-surrounding band and a clamping assembly integral therewith, said assembly comprising first and second interlocking parts, said parts each including a jaw, said jaws being opposed, a tongue spaced from and substantially parallel with each of said jaws to provide with said jaws a pair of cavities into which the opposing jaws may extend, said jaws interlocking by way of a set of triangularly prismoidal teeth on each jaw wherein as viewed in diametrical cross-section the vertex edges of the teeth of one jaw converge from the outer ends of such vertex-edges toward an exterior apical midpoint and the vertex-edges of the teeth of the other jaw converge to an interior apical midpoint, the said band having an inner surface with a longitudinal centreline of smaller diameter when tightened on a hose than the outer edges parallel therewith, and having said inner surface of said band in substantially diametrical cross-section of shallow conical configuration with the vertex projecting.

* * * * *